(12) United States Patent
Liu et al.

(10) Patent No.: US 10,079,971 B2
(45) Date of Patent: Sep. 18, 2018

(54) METHOD AND DEVICE FOR SETTING SHOOTING PARAMETER

(71) Applicant: Xiaomi Inc., Beijing (CN)

(72) Inventors: Lin Liu, Beijing (CN); Haipo Zhang, Beijing (CN); Chuan Gao, Beijing (CN)

(73) Assignee: Xiaomi Inc., Beijing (CN)

( * ) Notice: Subject to any disclaimer, the term of this patent is extended or adjusted under 35 U.S.C. 154(b) by 473 days.

(21) Appl. No.: 14/959,789

(22) Filed: Dec. 4, 2015

(65) Prior Publication Data

US 2016/0330368 A1 Nov. 10, 2016

(30) Foreign Application Priority Data

May 6, 2015 (CN) .......................... 2015 1 0226573

(51) Int. Cl.
*G06F 3/0484* (2013.01)
*H04N 5/232* (2006.01)
(Continued)

(52) U.S. Cl.
CPC ....... *H04N 5/23216* (2013.01); *G06F 3/0488* (2013.01); *G06F 3/04847* (2013.01);
(Continued)

(58) Field of Classification Search
CPC .................................................. G06F 3/04847
(Continued)

(56) References Cited

U.S. PATENT DOCUMENTS 6,690,387 B2 2/2004 Zimmerman et al.
7,184,064 B2 2/2007 Zimmerman et al.
(Continued)

FOREIGN PATENT DOCUMENTS

CN 1232128 C 12/2005
CN 103139481 A 6/2013
(Continued)

OTHER PUBLICATIONS

"How to set alarm on Apple iPhone 4", by HowTechs, availalable online at [https://www.youtube.com/watch?v=jqYbg4rBjlw], 8 pages.*
(Continued)

*Primary Examiner* — Reza Nabi
(74) *Attorney, Agent, or Firm* — Arch & Lake LLP

(57) ABSTRACT

The present disclosure relates to a method and a device for setting a shooting parameter. The method includes displaying a digital color temperature adjusting key and at least one scenario color temperature adjusting key in a menu bar on the touch screen, receiving a tapping signal on a digital color temperature adjusting key displayed on a touch screen, displaying a scrolling list according to the tapping signal. A first set of n color temperature values are displayed in the scrolling list and one color temperature value in the n color temperature values is in an active state. The method further includes receiving a scrolling signal associated with the scrolling list, scrolling the first set of n color temperature values to display a second set of n color temperature values in the scrolling list in response to the scrolling signal, and selecting as the shooting parameter a color temperature value which is in an active state. The present disclosure may solve the problem that the number of scenario adjusting modes is limited and a user is not able to adjust the color temperature values of all the scenarios.

9 Claims, 7 Drawing Sheets

(51) Int. Cl.
H04N 5/225 (2006.01)
G06F 3/0488 (2013.01)
H04N 9/73 (2006.01)
H04N 1/60 (2006.01)

(52) U.S. Cl.
CPC .......... *H04N 1/6086* (2013.01); *H04N 5/225* (2013.01); *H04N 5/23293* (2013.01); *H04N 9/735* (2013.01)

(58) Field of Classification Search
USPC ....................................................... 715/773
See application file for complete search history.

(56) References Cited

U.S. PATENT DOCUMENTS

| | | | | |
|---|---|---|---|---|
| 7,212,234 B2* | 5/2007 | Sakaguchi | ......... | H04N 5/23293 348/223.1 |
| 7,844,174 B2 | 11/2010 | Pickens et al. | | |
| 9,299,189 B1* | 3/2016 | Chater | ................ | G06T 15/503 |
| 9,819,874 B2* | 11/2017 | Chien | ................ | H04N 5/2354 |
| 9,824,637 B2* | 11/2017 | de Greef | ............ | G09G 3/3406 |
| 9,875,724 B2* | 1/2018 | Gao | ......... | G09G 5/02 |
| 2003/0122787 A1* | 7/2003 | Zimmerman | ....... | G06F 3/04883 345/173 |
| 2004/0017594 A1* | 1/2004 | Suekane | .............. | H04N 1/6011 358/516 |
| 2004/0125088 A1 | 7/2004 | Zimmerman et al. | | |
| 2006/0072028 A1* | 4/2006 | Hong | ................ | H04N 5/23216 348/333.01 |
| 2006/0170789 A1* | 8/2006 | Takahashi | ............. | H04N 9/735 348/223.1 |
| 2009/0027391 A1* | 1/2009 | Burley | ................... | G06T 15/04 345/426 |
| 2009/0243507 A1* | 10/2009 | Lucero-Vera | ......... | H05B 37/02 315/291 |
| 2009/0265664 A1* | 10/2009 | Shin | ...................... | H04N 5/232 715/810 |
| 2009/0290042 A1* | 11/2009 | Shiohara | ........... | H04N 1/00132 348/222.1 |
| 2010/0027983 A1* | 2/2010 | Pickens | ................. | G03B 13/32 396/125 |
| 2010/0238317 A1* | 9/2010 | Takeo | ..................... | H04N 9/73 348/223.1 |
| 2012/0127208 A1* | 5/2012 | Jo | ........................ | G06F 3/0485 345/684 |
| 2012/0200732 A1* | 8/2012 | Takeuchi | ............... | H04N 5/147 348/223.1 |
| 2013/0125209 A1* | 5/2013 | Schumacher | ......... | G06F 21/604 726/4 |
| 2013/0128073 A1* | 5/2013 | Seok | ...................... | H04N 9/735 348/223.1 |
| 2013/0155274 A1* | 6/2013 | Yoshino | ................. | H04N 9/735 348/223.1 |
| 2013/0155276 A1* | 6/2013 | Ueda | ........................ | G02B 7/36 348/223.1 |
| 2014/0027505 A1* | 1/2014 | Kuo | ..................... | G06K 7/0008 235/375 |
| 2014/0055481 A1* | 2/2014 | Gao | ......................... | G09G 5/02 345/589 |
| 2014/0267689 A1* | 9/2014 | Lavoie | ................... | H04N 7/183 348/113 |
| 2015/0046505 A1* | 2/2015 | Sun | ......................... | G09G 5/00 708/202 |
| 2015/0264329 A1* | 9/2015 | Takanashi | .............. | H04N 9/735 348/223.1 |
| 2015/0281561 A1* | 10/2015 | Zhao | ................... | H04N 5/23212 348/135 |
| 2015/0304567 A1* | 10/2015 | Zhao | ................. | H04N 5/23293 348/333.11 |
| 2016/0234184 A1* | 8/2016 | Liu | ......................... | H04L 63/08 |
| 2016/0234595 A1* | 8/2016 | Goran | .................. | H04R 3/002 |
| 2016/0284284 A1* | 9/2016 | Liu | ...................... | G09G 3/3607 |
| 2016/0330368 A1* | 11/2016 | Liu | ......................... | H04N 9/735 |
| 2017/0054960 A1* | 2/2017 | Chien | .................. | H04N 5/2258 |
| 2017/0374335 A1* | 12/2017 | Hsu | ......................... | H04N 9/73 |
| 2018/0048819 A1* | 2/2018 | Duran | .................. | H04N 5/2254 |

FOREIGN PATENT DOCUMENTS

| | | |
|---|---|---|
| CN | 104156149 A | 11/2014 |
| CN | 104168468 A | 11/2014 |
| EP | 2 455 850 A2 | 5/2012 |
| EP | 2 482 543 A1 | 8/2012 |
| JP | 2004349951 A | 12/2004 |
| JP | 2006054678 A | 2/2006 |
| JP | 2009282860 A | 12/2009 |
| JP | 2013515444 A | 5/2013 |
| JP | 2013198119 A | 9/2013 |
| KR | 10-20050079387 A | 8/2005 |
| KR | 20070096243 A | 10/2007 |
| KR | 20090005680 A | 1/2009 |
| KR | 20130059681 A | 6/2013 |
| RU | 129228 U1 | 6/2013 |

OTHER PUBLICATIONS

Qiang et al., English translation of CN104168468, published on Nov. 26, 2014, 24 pages.*
First Office Action (including English translation) issued in corresponding Chinese Patent Application No. 201510226573.0, dated Jun. 28, 2017, 20 pages.
Notification of Reasons for Refusal (including English translation) issued in corresponding Japanese Patent Application No. 2017-516026, dated Jul. 4, 2017, 5 pages.
Notification of Reason for Refusal (including English translation) issued in corresponding Korean Patent Application No. 10-2015-7033434, dated Aug. 16, 2016, 11 pages.
Notification of Reason for Refusal (including English translation) issued in corresponding Korean Patent Application No. 10-2015-7033434, dated Feb. 9, 2017, 9 pages.
Grant of Patent (including English translation) issued in corresponding Korean Patent Application No. 10-2015-7033434, dated Oct. 11, 2017, 7 pages.
International Search Report (including English translation) issued in corresponding International Application No. PCT/CN2015/090402, dated Feb. 3, 2016, 4 pages.
Notification of the results of examination of patentability (including English translation) issued in corresponding Russian Patent Application No. 2015152503/08(080915), dated Mar. 2, 2017, 13 pages.
Ivan Ostapenko, "Manual Camera: The First Android Application for Manual Photo Adjustment" (including English translation), URL: http://web.archive.org/web/20150122022829/http://redroid.ru/manualcamera/, published on Jan. 22, 2015, found in Internet on Mar. 2, 2017, 4 pages.
"The Why, When and How of using Custom White Balance," URL: http://www.learn.usa.canon.com/resources/blogs/2014/20140128_stoner_customwhitebalance_blog.shtml, Jan. 28, 2014, 3 pages.
"Understanding White Balance & Color Temperatures in 8 Steps," URL: https://www.slrlounge.com/tutorial-understanding-white-balance-colortemperatures-in-8-simple-steps/, Aug. 3, 2010, 7 pages.
Extended European Search Report dated Mar. 14, 2016 for European Application No. 15195680.2, 13 pages.
Ferreira, Armando, "Android Manual Camera App Overview," YouTube, <https://www.youtube.com/watch?v=uyo9pHQVrJA,> Feb. 3, 2015, 5 pages.
International Search Report dated Feb. 3, 2016 for International Application No. PCT/CN2015/090402, 5 pages.

* cited by examiner

METHOD AND DEVICE FOR SETTING SHOOTING PARAMETER

CROSS-REFERENCE TO RELATED APPLICATIONS

The present application is based upon and claims priority to Chinese Patent Application No. 201510226573.0, filed May 6, 2015, the entire contents of which are incorporated herein by reference.

FIELD

The present disclosure generally relates to the computer technical field, and more particularly, to a method and a device for setting a shooting parameter.

BACKGROUND

When performing shooting via a camera, the shot image may usually be influenced by environment light and thereby the quality of the shot image is not good. For example, when the environment light is light emitted from an incandescent lamp, since the light emitted from the incandescent lamp is yellowish, the color of the shot image is yellowish, and thereby image distortion occurs. Consequently, shooting parameters need to be set before shooting.

A shooting parameter influencing the color of an image is a color temperature value. Thus, related technologies provide a method for setting a shooting parameter, including the following steps. A terminal sets at least one scenario adjusting mode in advance, for example, a cloudy day mode, an incandescent lamp mode and the like, each of the scenario adjusting mode is used for setting a color temperature value corresponding to a kind of environment light. A user determines the type of the environment light according to the environment light of the scenario which he/she is currently in, and selects a corresponding scenario adjusting mode according to the type of the environment light, and performs setting using the preset color temperature value corresponding to the environment light of the scenario adjusting mode.

SUMMARY

Embodiments of the present disclosure provide a method and a device for setting a shooting parameter.

According to a first aspect of embodiments of the present disclosure, there is provided a method for setting a shooting parameter. The method includes receiving a tapping signal triggered on a digital color temperature adjusting key displayed on a touch screen, displaying a scrolling list according to the tapping signal, wherein there are n color temperature values displayed in the scrolling list and one color temperature value in the n color temperature values is in an active state, and n is a positive integer, receiving a scrolling signal acting on the scrolling list, and activating each of the n color temperature values in sequence according to the scrolling signal, and selecting a color temperature value which is finally in an active state for performing setting.

According to a second aspect of embodiments of the present disclosure, there is provided a device for setting a shooting parameter. The device includes a processor, and a memory for storing instructions executable by the processor. The processor is configured to perform receiving a tapping signal triggered on a digital color temperature adjusting key displayed on a touch screen, displaying a scrolling list according to the tapping signal, wherein there are n color temperature values displayed in the scrolling list and one color temperature value in the n color temperature values is in an active state, and n is a positive integer, receiving a scrolling signal acting on the scrolling list, and activating each of the n color temperature values in sequence according to the scrolling signal, and selecting a color temperature value which is finally in an active state for performing setting.

According to a third aspect of embodiments of the present disclosure, there is provided a non-transitory readable storage medium including instructions, executable by a processor in a device for setting a shooting parameter, the method including receiving a tapping signal triggered on a digital color temperature adjusting key displayed on a touch screen, displaying a scrolling list according to the tapping signal, wherein there are n color temperature values displayed in the scrolling list and one color temperature value in the n color temperature values is in an active state, and n is a positive integer, receiving a scrolling signal acting on the scrolling list, and activating each of the n color temperature values in sequence according to the scrolling signal, and selecting a color temperature value which is finally in an active state for performing setting.

The technical solutions provided by embodiments of the present disclosure may have the following advantageous effects. A tapping signal triggered on a digital color temperature adjusting key displayed on a touch screen is received. A scrolling list is displayed according to the tapping signal. There are n color temperature values displayed in the scrolling list and one color temperature value in the n color temperature values is in an active state. A scrolling signal acting on the scrolling list is received. Each of the n color temperature values in sequence is activated according to the scrolling signal, and a color temperature value which is finally in an active state is selected for performing setting. Thus, digital color temperature values may be directly displayed, and a user may select any one digital color temperature value according to actual scenario instead of selecting a fixed color temperature value corresponding to a scenario from limited number of scenarios. As a result, the present disclosure may solve the problem that the number of the scenario adjusting modes is limited and a user is not able to adjust the color temperature values of all the scenarios. Consequently, the color temperature values of all the scenarios can be adjusted, and thereby shooting effects of an image may be improved comprehensively.

It is to be understood that both the foregoing general description and the following detailed description are exemplary only and are not restrictive of the present disclosure.

DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

Figure 1:
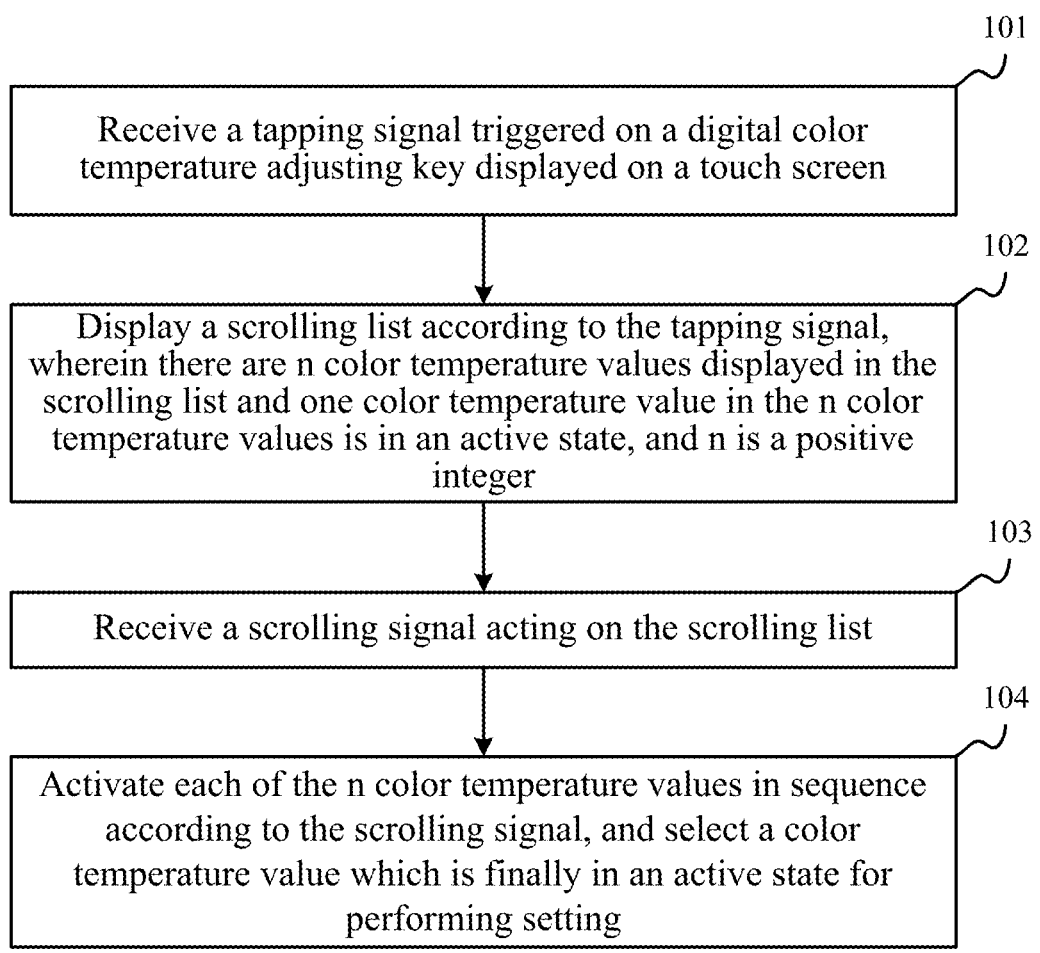
FIG. 1 is a flowchart showing a method for setting a shooting parameter according to an exemplary embodiment.

FIG. 1 is a flowchart showing a method for setting a shooting parameter according to an exemplary embodiment. As shown in FIG. 1, the method for setting a shooting parameter is applied in a terminal, and the method includes the following steps.

In step 101, a tapping signal triggered on a digital color temperature adjusting key displayed on a touch screen is received.

In step 102, a scrolling list is displayed according to the tapping signal. There are n color temperature values displayed in the scrolling list and one color temperature value in the n color temperature values is in an active state, and n is a positive integer.

In step 103, a scrolling signal acting on the scrolling list is received.

In step 104, each of the n color temperature values is activated in sequence according to the scrolling signal, and a color temperature value which is finally in an active state is selected for performing setting.

In summary, in the method for setting a shooting parameter provided by the present disclosure, a tapping signal triggered on a digital color temperature adjusting key displayed on a touch screen is received; a scrolling list is displayed according to the tapping signal, there are n color temperature values displayed in the scrolling list and one color temperature value in the n color temperature values is in an active state; a scrolling signal acting on the scrolling list is received; each of the n color temperature values is activated in sequence according to the scrolling signal, and a color temperature value which is finally in an active state is selected for performing setting. Thus, digital color temperature values may be directly displayed, and a user may select any one digital color temperature value according to actual scenario instead of selecting a fixed color temperature value corresponding to a scenario from limited number of scenarios. As a result, the present disclosure may solve the problem that the number of the scenario adjusting modes is limited and a user is not able to adjust the color temperature values of all the scenarios. Consequently, the color temperature values of all the scenarios can be adjusted, and thereby shooting effects of an image may be improved comprehensively.

Figure 2A:
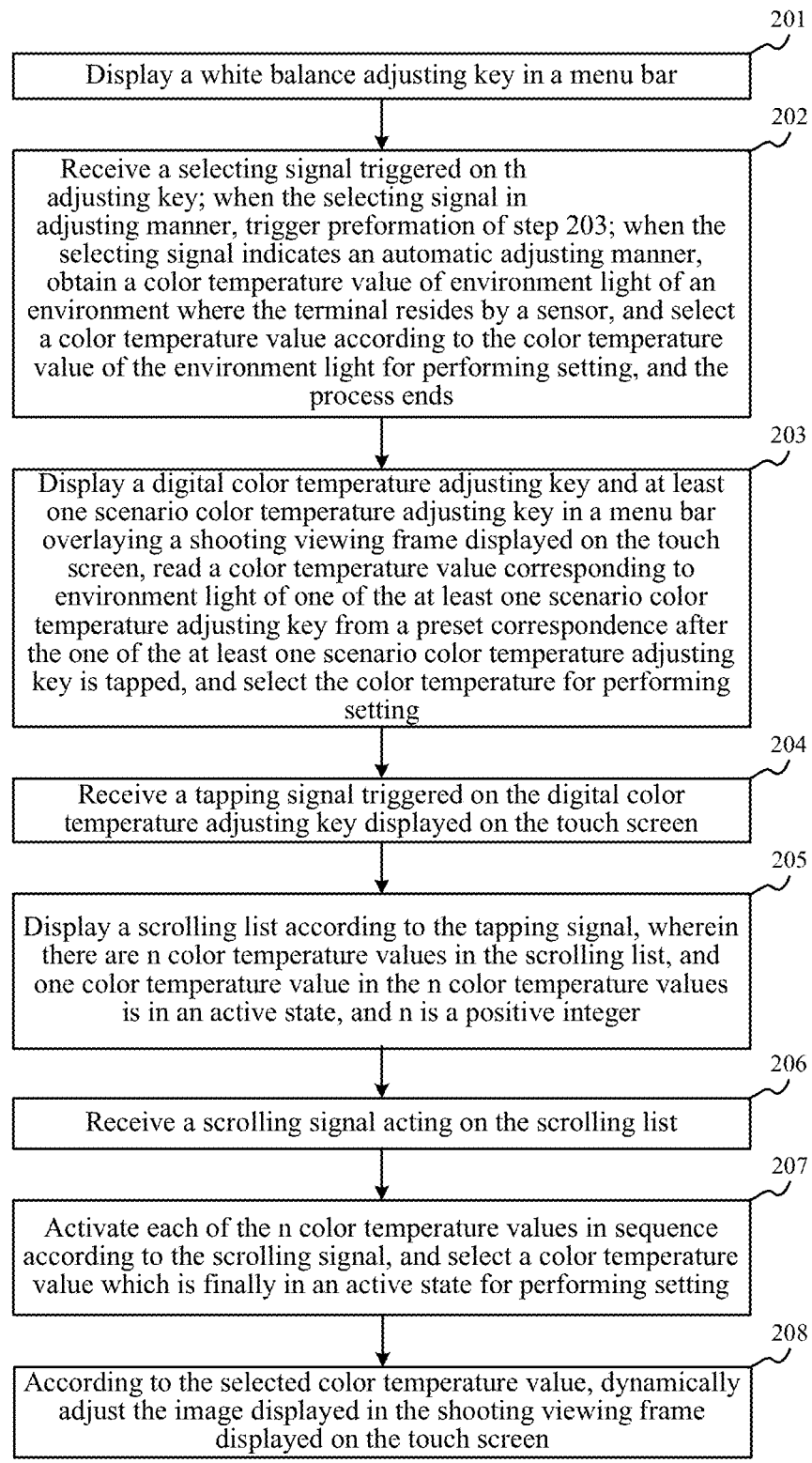
FIG. 2A is a flowchart showing a method for setting a shooting parameter according to another exemplary embodiment.

FIG. 2A is a flowchart showing a method for setting a shooting parameter according to another exemplary embodiment. As shown in FIG. 2A, the method for setting a shooting parameter is applied in a terminal and the method includes the following steps.

In step 201, a white balance adjusting key is displayed in a menu bar.

The menu bar is used for displaying adjusting keys for shooting parameters. For example, a white balance adjusting key, a focus key, a shutter time key and a light sensitivity key, and the like may be displayed in the menu bar. The white balance adjusting key is used for adjusting the color temperature values among shooting parameters. Generally, when the color temperature value among the shooting parameters is the same as the color temperature value of the environment light, the color fidelity of the shot image will be good.

Figure 2B:
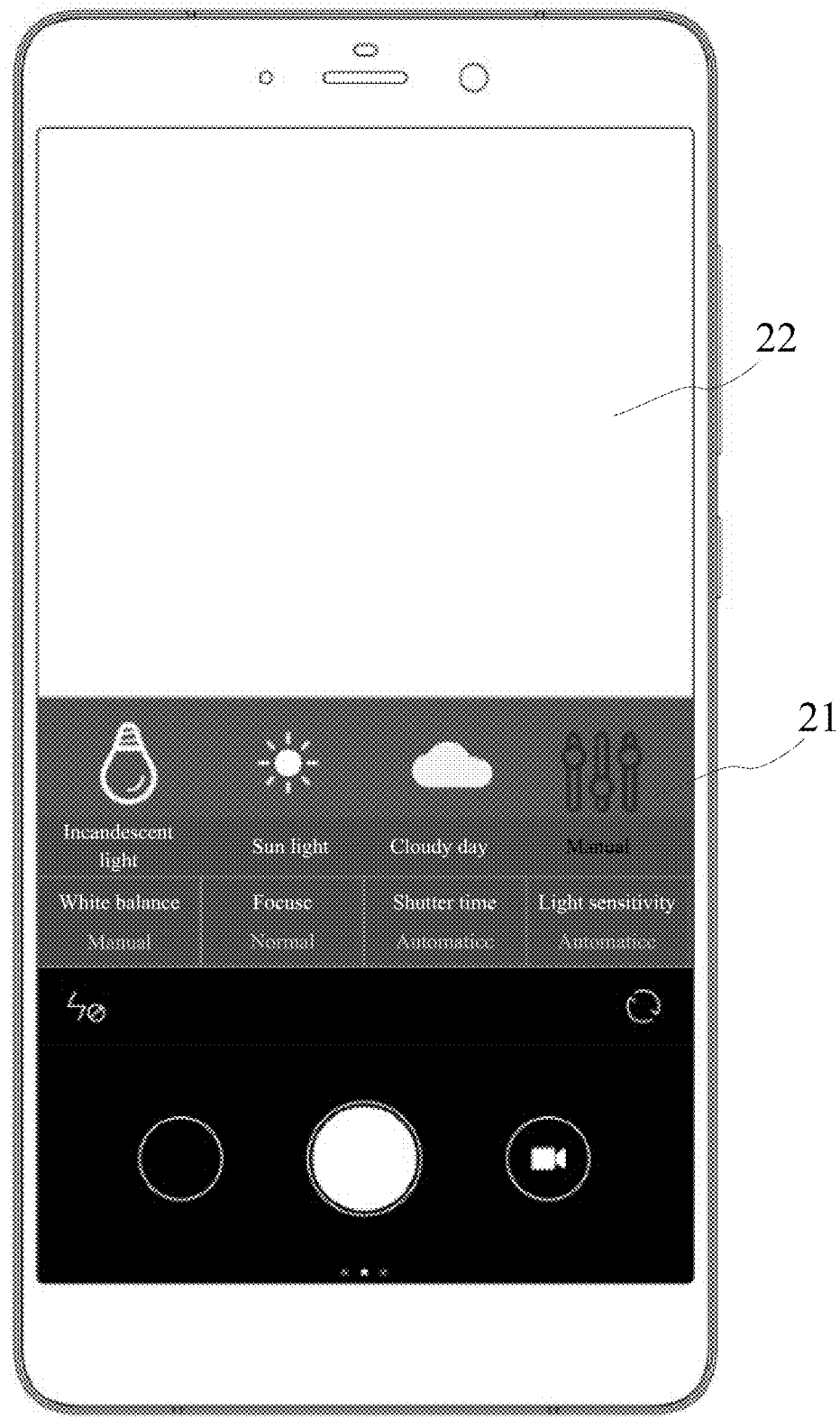
FIG. 2B is a schematic diagram showing a first kind of shooting interface according to the exemplary embodiment.

In order to facilitate setting of shooting parameters during shooting procedure, a shooting viewing frame and a menu bar may be displayed on a touch screen concurrently. At this time, the menu bar may be located within or outside the shooting viewing frame. Referring to FIG. 2B, a schematic diagram showing a first kind of shooting interface is shown. The grey menu bar 21 in FIG. 2B overlays a white shooting viewing frame 22.

In step 202, a selecting signal triggered on the white balance adjusting key is received. When the selecting signal indicates a manual adjusting manner, step 203 is triggered to be performed. When the selecting signal indicates an automatic adjusting manner, a color temperature value of environment light of an environment where the terminal resides is obtained by a sensor, and a color temperature value according to the color temperature value of the environment light is selected for performing setting, and the process ends.

In the present embodiment, the selecting signals with respect to the white balance adjusting key include at least two kinds of signals. The first kind of signals indicate a manual adjusting manner, and the second kind of signals indicate an automatic adjusting manner. A terminal may determine whether to perform a manual adjusting manner or an automatic adjusting manner according to which kind of selecting signals are triggered by a user. The manual adjusting manner refers to a manner of manually selecting the color temperature value among shooting parameters by a user according to the environment which the user is currently in. The automatic adjusting manner refers to a manner of automatically selecting the color temperature value among shooting parameters by a terminal according to the environment which the terminal is currently in.

When the user selects a manual adjusting manner, step 203 is triggered to be performed. When the user selects an automatic adjusting manner, a first implementation may be measuring the color temperature value of the environment light by a sensor in the terminal and selecting a color temperature value which is the same as the color temperature value of the environment light for setting shooting parameters, and a second implementation may be measuring a luminance value of the environment light by a sensor in the terminal, searching a color temperature value corresponding to the luminance value from a preset correspondence regarding color temperature values, and selecting the color temperature value for setting shooting parameters.

In step 203, a digital color temperature adjusting key and at least one scenario color temperature adjusting key are displayed in a menu bar overlaying a shooting viewing frame displayed on the touch screen, a color temperature value corresponding to environment light of one of the at least one scenario color temperature adjusting key is read from a preset correspondence after the one of the at least one scenario color temperature adjusting key is tapped, and the color temperature value is selected for performing setting.

The manual adjusting manner includes a digital adjusting manner and a scenario adjusting manner. The digital adjusting manner refers to that a terminal sets and displays the digits of respective color temperature values in advance, a user selects a digit among the displayed digits for setting the color temperature value among shooting parameters, and at this time, the terminal needs to display the digital color temperature adjusting key for entering the digital adjusting manner in the menu bar. The scenario adjusting key refers to that a terminal set scenarios in advance, a user selects a scenario from the displayed scenarios for setting the color temperature value among hooting parameters, and at this time, the terminal obtains types and color temperature values of environment light under different scenarios in advance, sets the color temperature value among shooting parameters as the color temperature value of the environment light, and establishes a correspondence between the type of the environment light and the color temperature value among the shooting parameters. For example, under a scenario where an incandescent lamp is turned on, the type of the environment light is the incandescent light, the color temperature value of the incandescent light is 2700K, and accordingly the terminal establishes a correspondence of "incandescent light-2700K". Under a cloudy day scenario, the type of the environment light is cloudy day, the color temperature value of the cloudy day is 6000K, and accordingly the terminal establishes a correspondence of "cloudy day-6000K".

The digital color temperature adjusting key and the scenario color temperature adjusting key may be displayed in the menu bar in any predetermined display manner. For example, they may be displayed in the same row in the menu bar, or they may be displayed as a circle, and the present embodiment does not impose specific limitations on this.

In the example as shown in FIG. 2B, the digital color temperature adjusting key and the scenario color temperature adjusting key are displayed in the same row in the menu bar. The scenario color temperature adjusting keys such as "Incandescent light", "Sun light", and "Cloudy day" and the digital color temperature adjusting key such as "Manual adjusting" are displayed in the menu bar of the terminal. If a user taps the "Incandescent light" among the above scenario color temperature adjusting keys, the terminal reads 2700K from the correspondence, and sets the value of the color temperature among the shooting parameters as 2700K.

In step 204, a tapping signal triggered on the digital color temperature adjusting key displayed on the touch screen is received.

In FIG. 2B, if a user taps the digital color temperature adjusting key "Manual adjusting", the terminal receives the tapping signal.

In step 205, a scrolling list is displayed according to the tapping signal. There are n color temperature values in the scrolling list, and one color temperature value among the n color temperature values is in an active state, and n is a positive integer.

The color temperature value in the active state can be used for setting the color temperature value among the shooting parameters. In the present embodiment, one color temperature value at the most can be in the active state at one moment. In an implementation, a predetermined region can be set in the scrolling list, and when the color temperature value scrolls into the predetermined region in the scrolling list, the color temperature value is in the active state, and when a color temperature value has not arrived at or has scrolled outside the predetermined region in the scrolling list, the color temperature value is in an inactive state. The predetermined region may be implemented as a selecting window and the like.

The displaying of a scrolling list according to the tapping signal may include 1) hiding the digital color temperature adjusting key and all of the at least one scenario color temperature adjusting key, and displaying the scrolling list in a display region obtained after the hiding, or 2) based on the location of the digital color temperature adjusting key, extending a display region towards a predetermined direction, and displaying the scrolling list in the display region.

Figure 2C:
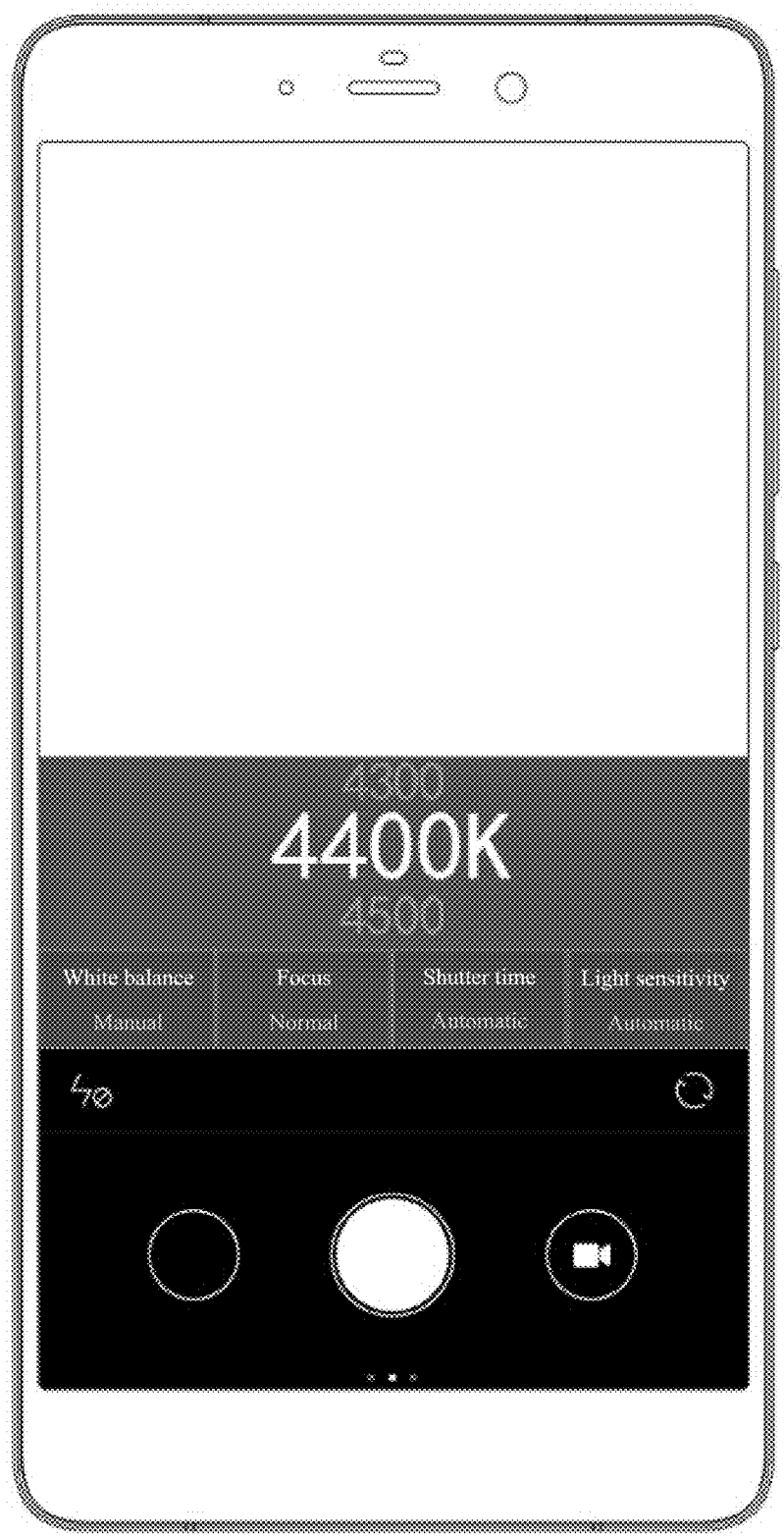
FIG. 2C is a schematic diagram showing a second kind of shooting interface according to the exemplary embodiment.

In the first displaying method, since a user taps the digital color temperature adjusting key, i.e., the user wants to select a digit of the color temperature values manually for setting the color temperature value among the shooting parameters. At this time, the digital color temperature adjusting key and the scenario color temperature adjusting key are both disabled, and thus may be hidden. The terminal displays the scrolling list in the display region obtained after the hiding. Referring to FIG. 2C, it shows a schematic diagram of a second kind of shooting interface. The scrolling list is displayed in the display region where the digital color temperature adjusting key and the scenario color temperature adjusting key are previously displayed. Optionally, the terminal may adjust the display region, for example, changing the width or height of the display region.

In the second displaying method, the terminal may maintain the digital color temperature adjusting key and the scenario color temperature adjusting key, and extend a display region towards a predetermined direction based on the location of the digital color temperature adjusting key, and displays the scrolling list in the display region. The predetermined direction may be any one direction such as a horizontal direction, a vertical direction and the like, and the present embodiment does not impose specific limitations on this.

It shall be noted that the color temperature values in the scrolling list may be ranked according to the order of values. For example, the color temperature values 4300, 4400 and 4500 are ranked in an ascending order in FIG. 2C, and a difference value 100K exists between adjacent color values. Rather, the difference value between adjacent color temperature values may be set as other values and the present embodiment does not impose specific limitations on this. Or, the color temperature values in the scrolling list may be ranked according to scenarios. For example, color temperature values corresponding to one scenario and color temperature values having a difference within a predetermined interval from the color temperature values are arranged together. Rather, the color temperature values in the scrolling list may be arranged according to other principles, and the present embodiment does not impose specific limitations on this.

In step 206, a scrolling signal acting on the scrolling list is received.

In step 207, each of the n color temperature values is activated in sequence according to the scrolling signal, and a color temperature value which is finally in an active state is selected for performing setting.

The activating each of the n color temperature values in sequence according to the scrolling signal, and selecting a color temperature value which is finally in an active state for performing setting may include 1) obtaining a scrolling direction and a scrolling speed of the scrolling signal, 2) scrolling the n color temperature values according to the scrolling direction and the scrolling speed, and reducing the scrolling speed during the scrolling procedure, when a color temperature value scrolls into a predetermined region in the scrolling list, the color temperature value is in the active state, and when a color temperature value has not arrived at the predetermined region in the scrolling list or has scrolled outside the predetermined region in the scrolling list, the color temperature value is in an inactive state, and 3) when the scrolling speed is smaller than a predetermined threshold, determining one color temperature value displayed in the predetermined region as the color temperature which is finally in the active state, and selecting the color temperature value for performing setting.

Under the acting of the scrolling signal, the terminal controls the n color temperature values to scroll at a scrolling speed along a scrolling direction. Assuming that a color temperature value displayed in the selecting window is in the active state, the scrolling list includes a first edge region, a middle display region adjacent to the first edge region, and a second edge region adjacent to the middle display region arranged in this order, and the selecting window is in the middle display region, the scrolling procedure of a color temperature value is as follows. When the color temperature value just scrolls to the display region of the scrolling list, the color temperature value is in the first edge region, and the color temperature value is in an inactive state, when the color temperature value scrolls from the first edge region to the middle display region, the color temperature value is in the selecting window, and the color temperature value is in the active state, and when the color temperature value scrolls from the middle display region to the second edge region, the color temperature value is in the inactive state.

Since the scrolling speed may be reduced during the scrolling procedure, when the scrolling stops, one color temperature value may happen to scroll into the middle display region, and the color temperature value at this time is the color temperature value which is finally in the active state, and the terminal selects the color temperature value for setting shooting parameters. The stop of the scrolling may refer to that the scrolling speed is zero, or that the scrolling speed is smaller than a predetermined threshold, and the present embodiment does not impose specific limitations on this.

Optionally, the method provided by the present embodiment further includes 1) when a color temperature value changes from the inactive state to the active state, distinguishingly displaying digits of the color temperature value, and 2) when a color temperature value changes from the active state to the inactive state, normally displaying digits of the color temperature value.

In order to conveniently distinguish a color temperature value in an active state and a color temperature value in an inactive state, a terminal may set different display effects for the color temperature value in the active state and the color temperature value in the inactive state. For example, the normal display font of the digits of a color temperature value is Song typeface, size 10, and the distinguishing display font of the digits of a color temperature value may be Song typeface, size 15, bold. Rather, the terminal may present distinguishing display effect by other manners and the present embodiment does not impose specific limitations on this.

In step 208, according to the selected color temperature value, the image displayed in the shooting viewing frame displayed on the touch screen is dynamically adjusted.

Since setting of the color temperature value among shooting parameters by selecting digits of the color temperature value is not intuitive, a user cannot predict the shooting effects according to the digits, and this may result in that the selected color temperature value is not accurate. In the present embodiment, the terminal may further dynamically adjust the image displayed in the shooting viewing frame displayed on the touch screen according to the selected color temperature value, and the shooting effects of the image to be shot may be previewed, and the user may determine whether a new color temperature value is needed to be set according to the previewing. Thus, the present embodiment solves the problem that the digital color temperature value is not intuitive and accurate color temperature values cannot be selected. Consequently, the accuracy of the selection of the color temperature values may be improved.

In summary, in the method for setting a shooting parameter provided by the present disclosure, a tapping signal triggered on a digital color temperature adjusting key displayed on a touch screen is received, a scrolling list is displayed according to the tapping signal, there are n color temperature values displayed in the scrolling list and one color temperature value in the n color temperature values is in an active state, a scrolling signal acting on the scrolling list is received, each of the n color temperature values is activated in sequence according to the scrolling signal, and a color temperature value which is finally in an active state is selected for performing setting. Thus, digital color temperature values may be directly displayed, and a user may select any one digital color temperature value according to actual scenario instead of selecting a fixed color temperature value corresponding to a scenario from limited number of scenarios. As a result, the present disclosure may solve the problem that the number of the scenario adjusting modes is limited and a user is not able to adjust the color temperature values of all the scenarios. Consequently, the color temperature values of all the scenarios can be adjusted, and thereby shooting effects of an image may be improved comprehensively.

Further, by dynamically adjusting the image displayed in the shooting viewing frame displayed on the touch screen according to the selected color temperature value, the shooting effects of the image to be shot may be previewed. Thus, the present embodiment solves the problem that the digital color temperature value is not intuitive and accurate color temperature values cannot be selected. Consequently, the accuracy of the selection of the color temperature values may be improved.

Figure 3:
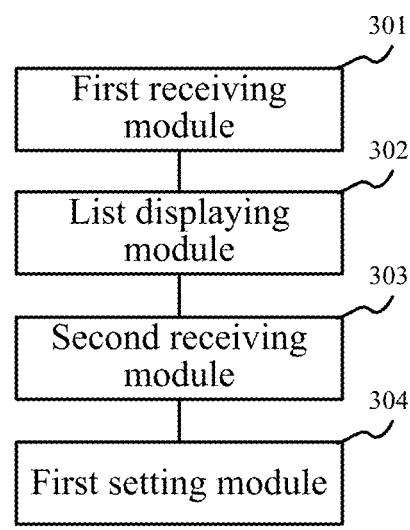
FIG. 3 is a block diagram showing a device for setting a shooting parameter according to another exemplary embodiment.

FIG. 3 is a block diagram showing a device for setting a shooting parameter according to another exemplary embodiment. As shown in FIG. 3, the device for setting a shooting parameter is applied in a terminal and includes a first receiving module 301, a list displaying module 302, a second receiving module 303 and a first setting module 304.

The first receiving module 301 is configured to receive a tapping signal triggered on a digital color temperature adjusting key displayed on a touch screen.

The list displaying module 302 is configured to display a scrolling list according to the tapping signal received by the first receiving module 301. N color temperature values are displayed in the scrolling list and one color temperature value in the n color temperature values is in an active state, and n is a positive integer.

The second receiving module 303 is configured to receive a scrolling signal acting on the scrolling list displayed by the list displaying module 302.

The first setting module 304 is configured to activate each of the n color temperature values in sequence according to the scrolling signal received by the second receiving module 303, and select a color temperature value which is finally in an active state for performing setting.

In summary, in the device for setting a shooting parameter provided by the present disclosure, a tapping signal triggered on a digital color temperature adjusting key displayed on a touch screen is received, a scrolling list is displayed according to the tapping signal, in which n color temperature values are displayed and one color temperature value in the n color temperature values is in an active state, a scrolling signal acting on the scrolling list is received, each of the n color temperature values is activated in sequence according to the scrolling signal, and a color temperature value which is finally in an active state is selected for performing setting. Thus, digital color temperature values may be directly displayed, and a user may select any one digital color temperature value according to actual scenario instead of selecting a fixed color temperature value corresponding to a scenario from limited number of scenarios. As a result, the present disclosure may solve the problem that the number of the scenario adjusting modes is limited and a user is not able to adjust the color temperature values of all the scenarios. Consequently, the color temperature values of all the scenarios can be adjusted, and thereby shooting effects of an image may be improved comprehensively.

Figure 4:
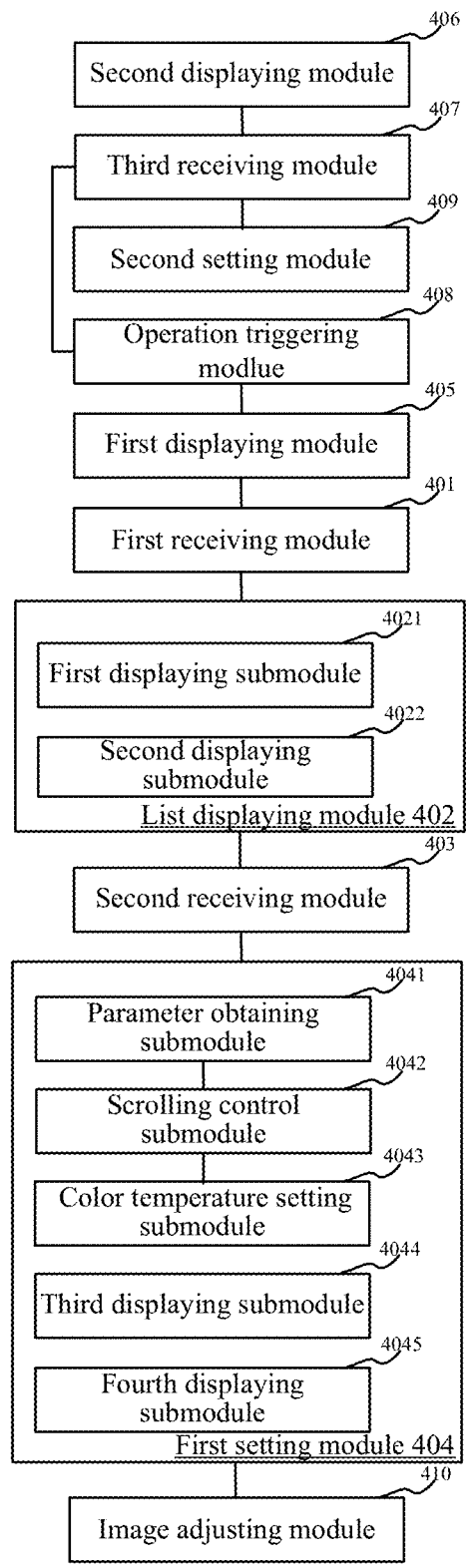
FIG. 4 is a block diagram showing a device for setting a shooting parameter according to another exemplary embodiment.

FIG. 4 is a block diagram showing a device for setting a shooting parameter according to another exemplary embodiment. As shown in FIG. 4, the device for setting a shooting parameter is applied in a terminal and includes a first receiving module 401, a list displaying module 402, a second receiving module 403 and a first setting module 404.

The first receiving module 401 is configured to receive a tapping signal triggered on a digital color temperature adjusting key displayed on a touch screen.

The list displaying module 402 is configured to display a scrolling list according to the tapping signal received by the first receiving module 401. N color temperature values are displayed in the scrolling list and one color temperature value in the n color temperature values is in an active state, and n is a positive integer.

The second receiving module 403 is configured to receive a scrolling signal acting on the scrolling list displayed by the list displaying module 402.

The first setting module 404 is configured to activate each of the n color temperature values in sequence according to the scrolling signal received by the second receiving module 403, and select a color temperature value which is finally in an active state for performing setting.

Optionally, the device provided by the present embodiment further includes a first displaying module 405.

The first displaying module 405 is configured to display the digital color temperature adjusting key and at least one scenario color temperature adjusting key in a menu bar overlaying a shooting viewing frame displayed on the touch screen, and read a color temperature value corresponding to environment light of one of the at least one scenario color temperature adjusting key from a preset correspondence after the one of the at least one scenario color temperature adjusting key is tapped, and select the color temperature value for performing setting.

Optionally, the list displaying module 402 includes a first displaying submodule 4021 and a second displaying submodule 4022.

The first displaying submodule 4021 is configured to hide the digital color temperature adjusting key and all of the at least one scenario color temperature adjusting key, and display the scrolling list in a display region obtained after the hiding.

The second displaying submodule 4022 is configured to, based on the location of the digital color temperature adjusting key, extend a display region towards a predetermined direction, and display the scrolling list in the display region.

Optionally, the device provided by the present embodiment further includes a second displaying module 406, a third receiving module 407, an operation triggering module 408 and a second setting module 409.

The second displaying module 406 is configured to display a white balance adjusting key in the menu bar.

The third receiving module 407 is configured to receive a selecting signal triggered on the white balance adjusting key displayed by the second displaying module 406.

The operation triggering module 408 is configured to, when the selecting signal received by the third receiving module 407 indicates a manual adjusting manner, trigger the operation of displaying the digital color temperature adjusting key and at least one scenario color temperature adjusting key in the menu bar overlaying the shooting viewing frame displayed on the touch screen.

The second setting module 409 is configured to, when the selecting signal indicates an automatic adjusting manner, obtain a color temperature value of environment light of an environment where a terminal resides by a sensor, and select a color temperature value according to the color temperature value of the environment light for performing setting.

Optionally, the device provided by the present embodiment further includes an image adjusting module 410.

The image adjusting module 410 is configured to, according to the selected color temperature value, dynamically adjust an image displayed in the shooting viewing frame displayed on the touch screen.

Optionally, the first setting module 404 includes a parameter obtaining submodule 4041, a scrolling control submodule 4042, and a color temperature setting submodule 4043.

The parameter obtaining submodule 4041 is configured to obtain a scrolling direction and a scrolling speed of the scrolling signal.

The scrolling control submodule 4042 is configured to scroll the n color temperature values according to the scrolling direction and the scrolling speed obtained by the parameter obtaining submodule 4041, and reduce the scrolling speed during the scrolling procedure. When a color temperature value scrolls into a predetermined region in the scrolling list, the color temperature value is in the active state, and when a color temperature value has not arrived at the predetermined region in the scrolling list or has scrolled outside the predetermined region in the scrolling list, the color temperature value is in an inactive state.

The color temperature setting submodule 4043 is configured to, when the scrolling speed is smaller than a predetermined threshold, determine one color temperature value displayed in the predetermined region as the color temperature value which is finally in the active state, and select the color temperature value for performing setting.

Optionally, the first setting module 404 further includes a third displaying submodule 4044 and a fourth displaying submodule 4045.

The third displaying submodule 4044 is configured to, when a color temperature value changes from the inactive state to the active state, distinguishingly display digits of the color temperature value.

The fourth displaying submodule 4045 is configured to, when a color temperature value changes from the active state to the inactive state, normally display digits of the color temperature value.

In summary, in the device for setting a shooting parameter provided by the present disclosure, a tapping signal triggered on a digital color temperature adjusting key displayed on a touch screen is received; a scrolling list is displayed according to the tapping signal, there are n color temperature values displayed in the scrolling list and one color temperature value in the n color temperature values is in an active state; a scrolling signal acting on the scrolling list is received; each of the n color temperature values is activated in sequence according to the scrolling signal, and a color temperature value which is finally in an active state is selected for performing setting. Thus, digital color temperature values may be directly displayed, and a user may select any one digital color temperature value according to actual scenario instead of selecting a fixed color temperature value corresponding to a scenario from limited number of scenarios. As a result, the present disclosure may solve the problem that the number of the scenario adjusting modes is limited and a user is not able to adjust the color temperature values of all the scenarios. Consequently, the color temperature values of all the scenarios can be adjusted, and thereby shooting effects of an image may be improved comprehensively.

Further, by dynamically adjusting the image displayed in the shooting viewing frame displayed on the touch screen according to the selected color temperature value, the shooting effects of the image to be shot may be previewed. Thus, the present embodiment solves the problem that the digital color temperature value is not intuitive and accurate color temperature values cannot be selected. Consequently, the accuracy of the selection of the color temperature values may be improved.

The specific manners for respective modules performing operations in the above devices of the embodiments have been described in the embodiments relating to the methods, and a duplicate description is omitted herein.

An exemplary embodiment of the present disclosure provides a device for setting a shooting parameter which is capable of implementing the method for setting a shooting parameter provided by the present disclosure. The device for setting a shooting parameter includes a processor and a memory for storing instructions executable by the processor. The processor is configured to perform receiving a tapping signal triggered on a digital color temperature adjusting key displayed on a touch screen, displaying a scrolling list according to the tapping signal, where n color temperature values are displayed and one color temperature value in the n color temperature values is in an active state, and n is a positive integer, receiving a scrolling signal acting on the scrolling list, and activating each of the n color temperature values in sequence according to the scrolling signal, and selecting a color temperature value which is finally in an active state for performing setting.

Figure 5:
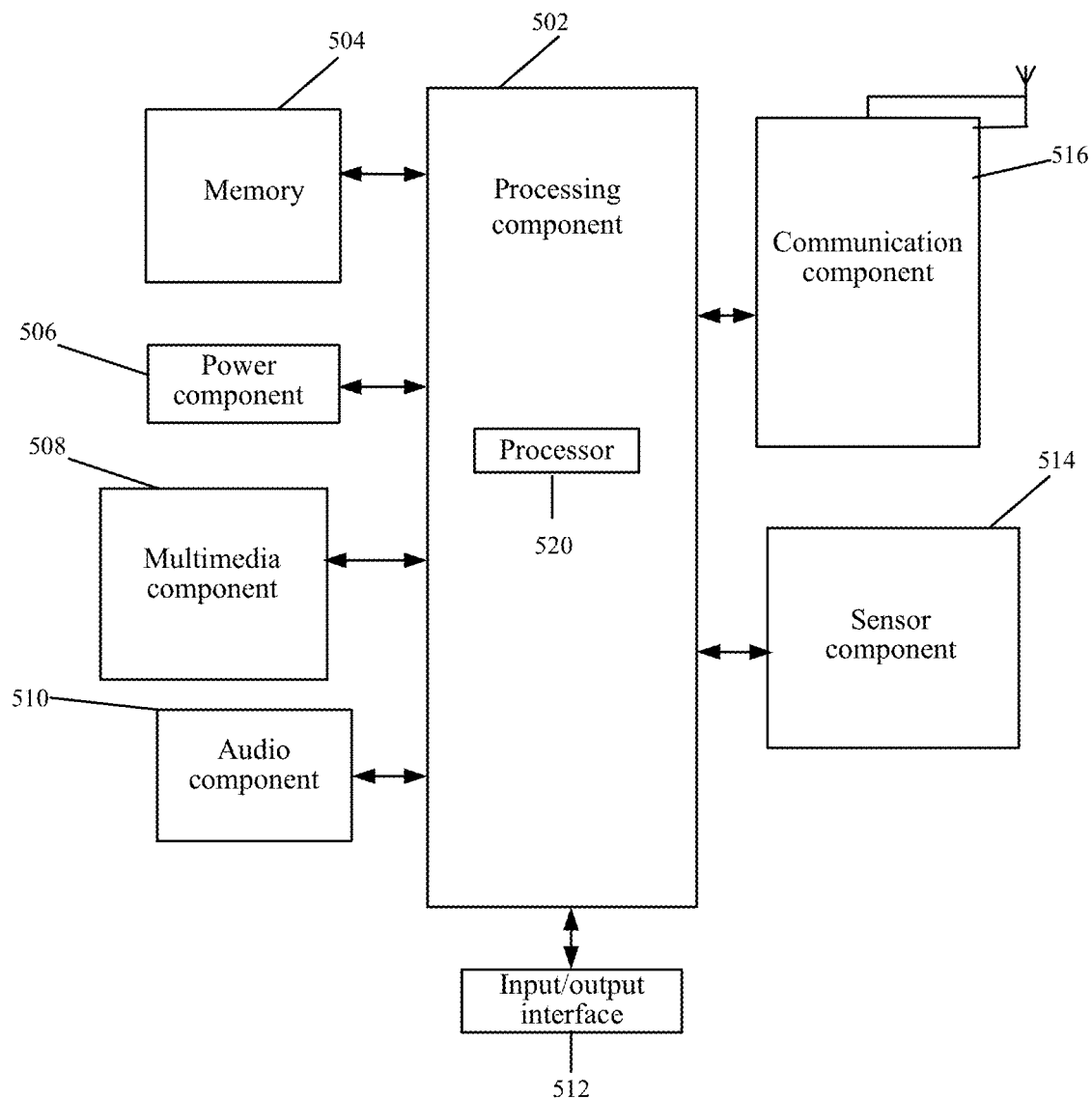
FIG. 5 is a block diagram showing a device for setting a shooting parameter according to another exemplary embodiment.

FIG. 5 is a block diagram showing a device 500 for setting a shooting parameter according to another exemplary embodiment. For example, the device 500 may be a mobile phone, a computer, a digital broadcast terminal, a messaging device, a gaming console, a tablet, a medical device, exercise equipment, a personal digital assistant, and the like.

Referring to FIG. 5, the device 500 may include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the device 500, such as the operations associated with display, telephone calls, data communications, camera operations, and recording operations. The processing component 502 may include one or more processors 520 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the device 500. Examples of such data include instructions for any applications or methods operated on the device 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the device 500. The power component 506 may include a power management system, one or more power sources, and any other components associated with the generation, management, and distribution of power in the device 500.

The multimedia component 508 includes a screen providing an output interface between the device 500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 508 includes a front camera and/or a rear camera. The front camera and the rear camera may receive an external multimedia datum while the device 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone ("MIC") configured to receive an external audio signal when the device 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the device 500. For instance, the sensor component 514 may detect an open/closed status of the device 500, relative positioning of components, e.g., the display and the keypad, of the device 500, a change in position of the device 500 or a component of the device 500, a presence or absence of user contact with the device 500, an orientation or an acceleration/deceleration of the device 500, and a change in temperature of the device 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate communication, wired or wirelessly, between the device 500 and other devices. The device 500 can access a wireless network based on a communication standard, such as WiFi, 2G, or 3G, or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 504, executable by the processor 520 in the device 500, for performing the above-described methods. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for setting a shooting parameter of a device containing a touch screen comprising:
displaying a digital color temperature adjusting key and at least one scenario color temperature adjusting key in a menu bar on the touch screen;
receiving a tapping signal on the digital color temperature adjusting key displayed on the touch screen;
displaying a scrolling list in response to the tapping signal, wherein a first set of n color temperature values are displayed in the scrolling list and one color temperature value in the first set of n color temperature values is in an active state;
receiving a scrolling signal associated with the scrolling list;
scrolling the first set of n color temperature values to display a second set of n color temperature values in the scrolling list in response to the scrolling signal; and
selecting as the shooting parameter a color temperature value which is in an active state among the second set of n color temperature values, wherein based on the selected color temperature value, dynamically adjusting an image displayed on the touch screen,
wherein the method further comprising:
receiving a tapping signal triggered on one of the at least one scenario color temperature adjusting key; and
selecting as the shooting parameter a preset color temperature value corresponding to environment light of the one of the at least one scenario color temperature adjusting key,
wherein the displaying the scrolling list according to the tapping signal comprises: hiding the digital color temperature adjusting key and all of the at least one scenario color temperature adjusting key from the touch screen, and displaying the scrolling list in a display region obtained after the hiding, and
based on a location of the digital color temperature adjusting key on the screen, extending a display region for the scrolling list towards a predetermined direction, and displaying the scrolling list in the display region.

2. The method according to claim 1, further comprising:
displaying a white balance adjusting key in the menu bar;
receiving a selecting signal triggered on the white balance adjusting key;
when the selecting signal indicates a manual adjusting manner, displaying the digital color temperature adjusting key and at least one scenario color temperature adjusting key in the menu bar on the touch screen; and
when the selecting signal indicates an automatic adjusting manner, selecting as the shooting parameter a color temperature value of environment light of an environment where the device locates by a sensor.

3. The method according to claim 1, wherein
scrolling the first set of n color temperature values to display a second set of n color temperature values in the scrolling list comprises:
obtaining a scrolling direction and a scrolling speed of the scrolling signal;
scrolling the first set of n color temperature values based on the scrolling direction and the scrolling speed, and reducing the scrolling speed as the scrolling proceeds, wherein when a color temperature value scrolls into a predetermined region in the scrolling list, the color temperature value is in the active state, and when a color temperature value has not arrived at the predetermined region in the scrolling list or has scrolled outside the predetermined region in the scrolling list, the color temperature value is in an inactive state; and
when the scrolling speed is smaller than a predetermined threshold, determining one color temperature value displayed in the predetermined region as the shooting parameter.

4. The method according to claim 3, further comprising:
when a color temperature value changes from the inactive state to the active state, distinguishingly displaying digits of the color temperature value; and
when a color temperature value changes from the active state to the inactive state, normally displaying digits of the color temperature value.

5. A device for setting a shooting parameter, comprising:
a processor; and
a memory for storing instructions executable by the processor, wherein the processor is configured to perform:
displaying a digital color temperature adjusting key and at least one scenario color temperature adjusting key in a menu bar on a touch screen;
receiving a signal associated with tapping on the digital color temperature adjusting key displayed on a touch screen;
displaying a scrolling list in response to the signal associated with tapping, wherein a first set of n color temperature values are displayed in the scrolling list and one color temperature value in the first set of n color temperature values is in an active state; receiving a signal associated with scrolling on the scrolling list; and
scrolling the first set of n color temperature values to display a second set of n color temperature values in the scrolling list in response to the scrolling signal; and
selecting as the shooting parameter a color temperature value which is in an active state among the second set of n color temperature values, wherein based on the selected color temperature value, dynamically adjusting an image displayed on the touch screen,
wherein the processor is further configured to perform:
receiving a signal associated with tapping on one of the at least scenario color temperature adjusting key; and
selecting as the shooting parameter a present color temperature value corresponding to environment light of the one of the at least one scenario color temperature adjusting key,
wherein the processor is configured to perform: hiding the digital color temperature adjusting key and all of the at least one scenario color temperature adjusting key from the touch screen, and displaying the scrolling list in a display region obtained after the hiding, and
based on a location of the digital color temperature adjusting key, extending a display region for the scrolling list towards a predetermined direction, and displaying the scrolling list in the display region.

6. The device according to claim 5, wherein the processor is further configured to perform:
displaying a white balance adjusting key in the menu bar; receiving a selecting signal triggered on the white balance adjusting key; when the selecting signal indicates a manual adjusting manner, displaying the digital color temperature adjusting key and at least one scenario color temperature adjusting key in the menu bar on the touch screen; and
when the selecting signal indicates an automatic adjusting manner, selecting as the shooting parameter a color temperature value of environment light of an environment where the device locates by a sensor.

7. The device according to claim 5, wherein the processor is configured to perform: obtaining a scrolling direction and a scrolling speed of the scrolling signal;
scrolling the first set of n color temperature values based on the scrolling direction and the scrolling speed, and reducing the scrolling speed as the scrolling proceeds, wherein when a color temperature value scrolls into a predetermined region in the scrolling list, the color temperature value is in the active state; and when a color temperature value has not arrived at the predetermined region in the scrolling list or has scrolled outside the predetermined region in the scrolling list, the color temperature value is in an inactive state; and
when the scrolling speed is smaller than a predetermined threshold, determining one color temperature value displayed in the predetermined region as the shooting parameter.

8. The device according to claim 7, wherein the processor is further configured to perform:
when a color temperature value changes from the inactive state to the active state, distinguishingly displaying digits of the color temperature value; and
when a color temperature value changes from the active state to the inactive state, normally displaying digits of the color temperature value.

9. A non-transitory readable storage medium comprising instructions that, when executed by a processor in a device, causes the device to perform a method for setting a shooting parameter, the method comprising:
displaying a digital color temperature adjusting key and at least one scenario color temperature adjusting key in a menu bar on the touch screen;
receiving a tapping signal triggered on the digital color temperature adjusting key displayed on a touch screen;
displaying a scrolling list in response to the tapping signal, wherein a set of n color temperature values are displayed in the scrolling list and one color temperature value in the first set of n color temperature values is in an active state;
receiving a scrolling signal associated with the scrolling list;
scrolling the first set of n color temperature values to display a second set of n color temperature values in the scrolling list in response to the scrolling signal; and
selecting as the shooting parameter a color temperature value which is in an active state among the second set of n color temperature values, wherein based on the selected color temperature value, dynamically adjusting an image displayed on the touch screen,
wherein the processor is further configured to perform:
receiving a signal associated with tapping on one of the at least scenario color temperature adjusting key; and
selecting as the shooting parameter a present color temperature value corresponding to environment light of the one of the at least one scenario color temperature adjusting key,
wherein the processor is configured to perform: hiding the digital color temperature adjusting key and all of the at least one scenario color temperature adjusting key from the touch screen, and displaying the scrolling list in a display region obtained after the hiding, and
based on a location of the digital color temperature adjusting key, extending a display region for the scrolling list towards a predetermined direction, and displaying the scrolling list in the display region.

* * * * *